United States Patent
Van Den Dungen et al.

(10) Patent No.: US 11,330,053 B1
(45) Date of Patent: May 10, 2022

(54) MAKING EVENTUAL CONSISTENCY CACHE UPDATES DETERMINISTIC

(71) Applicant: Oracle International Corporation, Redwood Shores, CA (US)

(72) Inventors: Martinus Petrus Lambertus Van Den Dungen, Redmond, WA (US); James William Salmon, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/179,189

(22) Filed: Feb. 18, 2021

(51) Int. Cl.
*H04L 67/1095* (2022.01)
*H04L 45/74* (2022.01)
*H04L 67/60* (2022.01)
*H04L 43/0823* (2022.01)

(52) U.S. Cl.
CPC ...... *H04L 67/1095* (2013.01); *H04L 43/0823* (2013.01); *H04L 45/74* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 6,457,065 B1* | 9/2002 | Rich | ................... | G06F 16/2379 719/329 |
| 10,983,719 B1* | 4/2021 | Williams | .............. | G06F 3/0604 |
| 2002/0198899 A1* | 12/2002 | Yamaguchi | ............. | G06F 16/27 |
| 2019/0197173 A1* | 6/2019 | Tahara | ..................... | G06F 3/065 |
| 2019/0392006 A1* | 12/2019 | Horowitz | .............. | G06F 16/178 |
| 2020/0394317 A1* | 12/2020 | White | ....................... | H04L 9/14 |
| 2021/0042292 A1* | 2/2021 | Gentric | ............... | G06F 16/2365 |
| 2021/0397599 A1* | 12/2021 | Watson | ................. | G06F 16/273 |

OTHER PUBLICATIONS

Document Best Practices for Eventual Consistency #189, Available Online at: https://github.com/neos/Neos.EventSourcing/issues/189, Accessed from internet on Aug. 18, 2020, 5 pages.
(Continued)

*Primary Examiner* — Kevin T Bates
*Assistant Examiner* — Dae Kim
(74) *Attorney, Agent, or Firm* — Kilpatrick Townsend & Stockton LLP

(57) ABSTRACT

Techniques for making eventual consistency cache updates deterministic. One technique includes receiving, at a control plane, a request to execute an operation on data, executing the operation on the data, creating a replication event for the operation and a replication identifier associated with the replication event, sending a response that includes a custom header having the replication identifier, receiving, at a data plane, a subsequent request to execute an operation involving the data, the subsequent request includes the replication identifier, retrieving a replication identifier for a latest replication event executed on the data plane, comparing the replication identifier from the subsequent request and the replication identifier for the latest replication event, determining the replication event associated with the replication identifier from the subsequent request has not been executed on the data plane based on the comparison, and sending a deterministic error message to the client device.

20 Claims, 8 Drawing Sheets

(56) References Cited

OTHER PUBLICATIONS

On Eventual Consistency and REST, Available Online at: https://pillopl.github.io > eventual-consistency-and-rest, 2020, 2 pages.
Resources—Retries and Customizable Timeouts, Available Online at: https://www.terraform.io/docs/extend/resources/retries-and-customizable-timeouts.html#statechangeconf, Accessed from internet on Aug. 18, 2020, 4 pages.
Troubleshooting API Request Errors, Available Online at: https://docs.aws.amazon.com/AWSEC2/latest/APIReference/query-api-troubleshooting.html#eventual-consistency, 2020, 3 pages.
Kruger, Cloudant Best (and Worst) Practices—Part 2, Available Online at: https://www.ibm.com/cloud/blog/cloudant-best-and-worst-practices-part-2, Mar. 19, 2019, 5 pages.
Wali; Zinat, Cassandra—Achieving High Availability While Maintaining Consistency, Data Engineering, Available Online at: https://blog.scottlogic.com/2017/10/06/cassandra-eventual-consistency.html, Oct. 6, 2017, 8 pages.

* cited by examiner

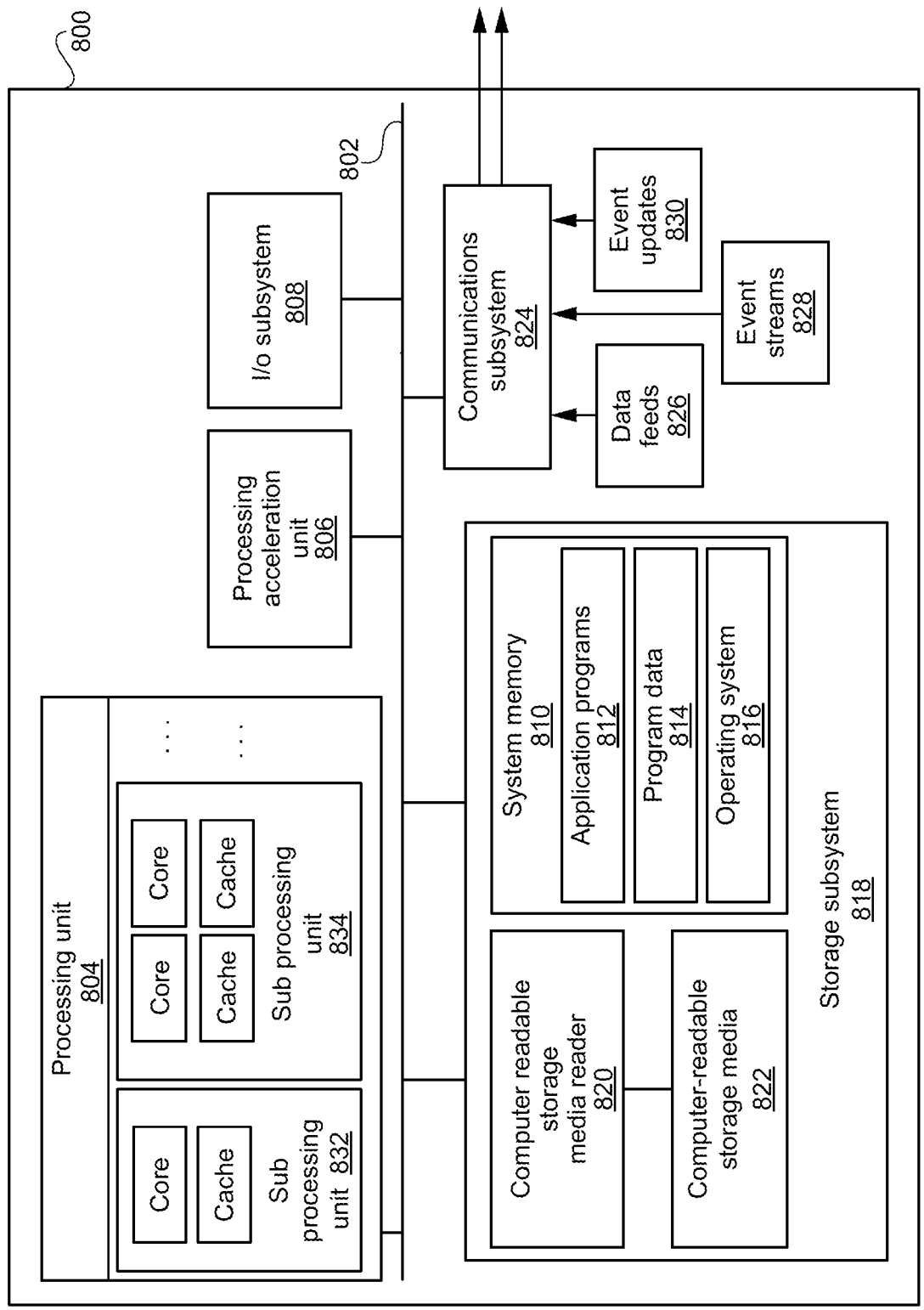

US 11,330,053 B1

MAKING EVENTUAL CONSISTENCY CACHE UPDATES DETERMINISTIC

FIELD OF THE INVENTION

The present disclosure relates generally to data integration, and more particularly, to techniques for making eventual consistency cache updates deterministic.

BACKGROUND

Integrating data and applications throughout an enterprise, and presenting them in a unified view is a complex proposition. Not only are there broad disparities in technologies, data structures, and application functionality, but there are also fundamental differences in integration architectures. Some integration needs are data oriented, especially those involving large data volumes. Other integration projects lend themselves to an Event Driven Architecture (EDA) or a Service Oriented Architecture (SOA), for asynchronous or synchronous integration. Data integration ensures that information is timely, accurate, and consistent across complex systems. Although data integration is frequently referred as Extract-Transform-Load (ETL)—data integration was initially considered as the architecture used for loading enterprise data warehouse systems—however data integration now includes data movement, data synchronization, data quality, data management, and data services.

A data integrator provides a solution for building, deploying, and managing complex data warehouses or as part of data-centric architectures in a SOA or business intelligence environment. In addition, the data integrator combines all the elements of data integration—data movement, data synchronization, data quality, data management, and data services—to ensure that information is timely, accurate, and consistent across complex systems. An example of a data integrator is the Oracle Data Integrator (ODI), which features an active integration platform that includes all styles of data integration: data-based, event-based and service-based. ODI unifies silos of integration by transforming large volumes of data efficiently, processing events in real time through its Changed Data Capture (CDC) framework, and providing data services to the Oracle SOA Suite. ODI also provides robust data integrity control features, assuring the consistency and correctness of data.

The data integrity control features of a data integrator such as ODI typically include automated integration testing. Integration tests often involve running end-to-end ETL, data movement, data synchronization, data quality, data management, and data service routines that may invoke various components and data across a data plane. To ensure that all components and data processing completed as expected, the developers and quality assurance team will want to determine whether the correct end-to-end ETL, data movement, data synchronization, data quality, data management, and data service routines executed and whether key business rules were properly applied. In other words, they will want the integration test to repeat many of the unit and individual component tests. However, the challenges of integration testing are substantially different from conventional software testing. For example, challenges typically include incompatibility of data, loss of data, volume and complexity of data, faults in the business process and procedures, missing business flow information, failed or delayed replication of data, and unavailability of testing data or testing processes. Accordingly, efficient techniques for data integration and particularly integration testing are desired.

BRIEF SUMMARY

Techniques are provided (e.g., a method, a system, non-transitory computer-readable medium storing code or instructions executable by one or more processors) for making eventual consistency cache updates deterministic.

In various embodiments, a method is provided for that comprises: receiving, at a control plane of a computing system, a first request to execute a first operation on data, wherein the request is received from a client device; executing, by the computing system, the first operation on the data; creating, by the computing system, a replication event for the operation and a first replication identifier associated with the replication event, where the replication event will be used to replicate execution of the first operation on a data plane; sending, by the computing system, a response back to the client device concerning the execution of the first operation on the data, where the response comprises a custom header having the first replication identifier; receiving, at the data plane of the computing system, a second request to execute a second operation involving the data, where the second request is received from the client device and includes the custom header having the first replication identifier; in response to receiving the second request, retrieving, by the computing system, a second replication identifier for a latest replication event executed on the data plane; comparing, by the computing system, the first replication identifier and the second replication identifier; determining, by the computing system, whether the replication event associated with the first replication identifier from the custom header has been executed on the data plane based on the comparison between the first replication identifier and the second replication identifier; and in response to determining the replication event has not been executed on the data plane, sending, by the computing system, an error message to the client device, where the error message is indicative that the replication event has not been executed on the data plane.

In some embodiments, the first request is to create, read, update, and/or delete the data, which is to be or presently integrated as part of an application to be or presently deployed on the computing system, and where the error message is deterministic that the replication event has not been executed on the data plane.

In some embodiments, the executing the first operation comprises: creating, by the computing system, a resource that schedules a background task to run and produce another resource that requires replication; in response to scheduling the background task, writing, by the computing system, a substitute replication identifier associated with the background task and the first operation to a data table, where the response comprises the custom header having the substitute replication identifier rather than the first replication identifier; executing, by the computing system, the background task to run and produce the another resource that requires replication; and in response to completing execution of the background task, writing, by the computing system, the first replication identifier associated with the first operation to the data table.

In some embodiments, the second request includes the custom header having the substitute replication identifier; and in response to receiving the substitute replication identifier, identifying, by the computing system, the first replication identifier from the data table using the substitute replication identifier as a key.

In some embodiments, the method further comprises: writing, by the computing system, the first request to an inbox table in a replication database located within a subscriber region, where the control plane is located within a home region; and writing, by the computing system, the first replication identifier associated with the first operation to a data table, where the executing the first operation comprises: executing, by a backfill processor within the subscriber region of the computing system, the first operation of the first request from the inbox table in the replication database; and in response to executing the first operation within the subscriber region, writing, by the computing system, a substitute replication identifier associated with first operation to the data table, wherein the response comprises the custom header having the substitute replication identifier rather than the first replication identifier.

In some embodiments, the second request includes the custom header having the substitute replication identifier; and in response to receiving the substitute replication identifier, identifying, by the computing system, the first replication identifier from the data table using the substitute replication identifier as a key.

In some embodiments, the determining whether the replication event associated with the first replication identifier from the custom header has been executed on the data plane comprises determining whether the first replication identifier from the custom header of the second request issued prior to, at the same time, or after issuance of the second replication identifier for the latest replication event.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 8 depicts a block diagram illustrating an example computer system in accordance with various embodiments.

DETAILED DESCRIPTION

Figure 1:
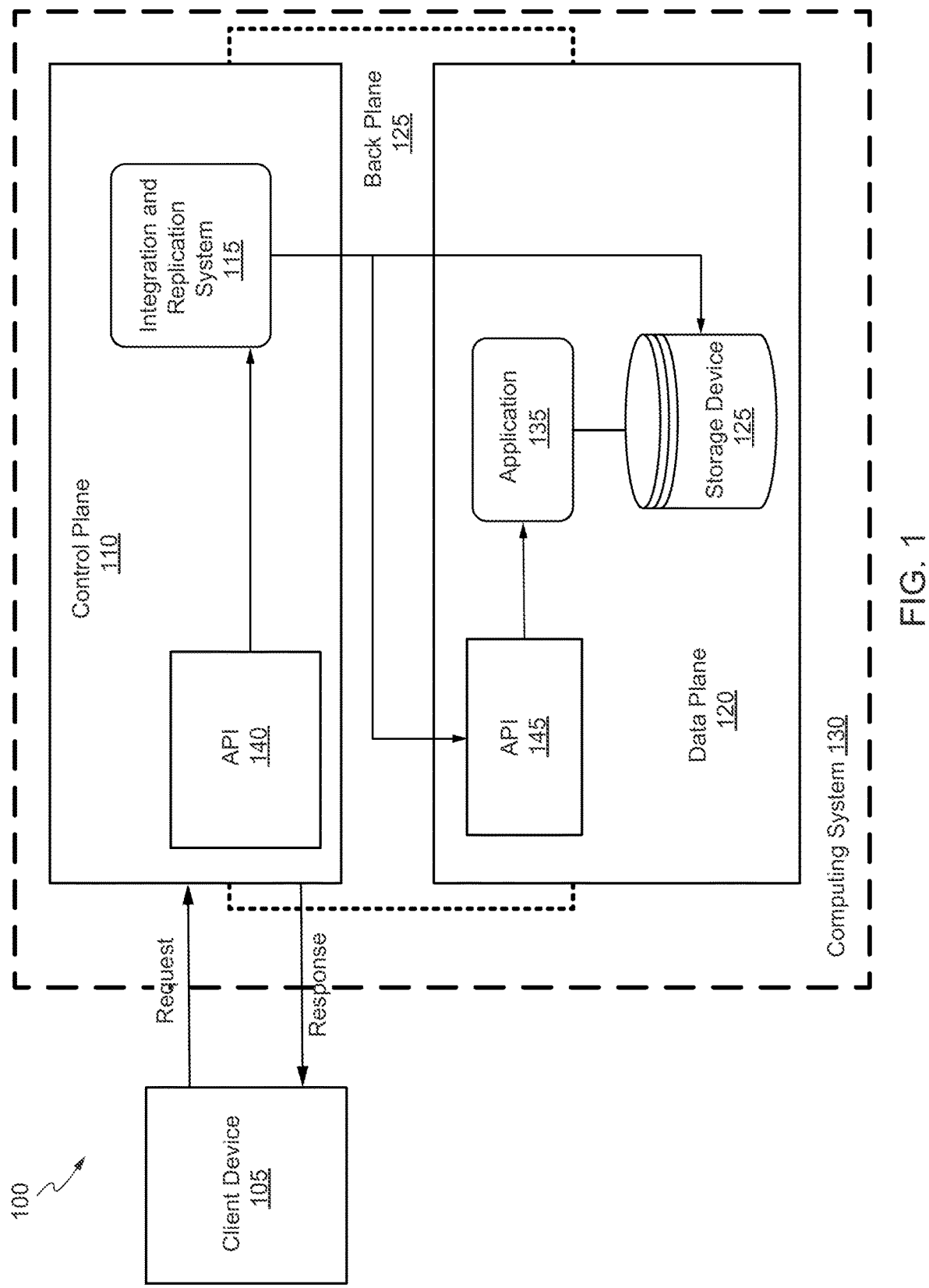
FIG. 1 depicts a block diagram illustrating a computing system for making eventual consistency cache updates deterministic in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In computing, a control plane is the part of the software that configures and controls the data plane. For example, the control plane may be used for adding, updating, and removing data (e.g., in terms of an authentication system—creation of users, entities, and policies governing users access) on the data plane. In contrast, the data plane (sometimes referred to as the forwarding plane) is the part of the software that processes the data requests (e.g., implements business logic). For example, the data plane takes the users, entities, and policies, and implements business logic on top of them (e.g., authentication and authorization). When data is added, updated, and removed on the control plane, an integration process is executed (e.g., via a data integrator) to replicate those operations and data changes on the data plane. The integration of data on the data plane may then be tested using integration testing (e.g., automation tools running integration of new data/business logic to be implemented on a system). In an integration test, the process flow typically follows: (i) add, update, or remove data on control plane, (ii) replicate and integrate data on data plane, and (iii) validate that business logic is implemented correctly in data plane based on added, updated, or removed data.

Typically, when the data is added, updated, and removed on the control plane, there needs to be communication on the back plane between the control plane and the data plane in order to facilitate replication and integration of data from the control plane to the data plane. However, if requests and calls for services are made to the data plane based on the data present on the control plane or expected to be present on the data plane before the data has been replicated and integrated via the back plane to the data plane, then an error occurs because the data plane does not know of the data yet to use the data within the business logic being tested. This problem is common to integration testing where tests are waiting and retrying requests while the data plane is synchronizing with the control plane. When integration tests are run on multiple threads on the same machine, the CPU becomes very busy and may not get enough time to replicate and integrate the data to the data plane. This causes intermittent test failures (e.g., error—data not found).

Developers try to work around these test failures by increasing the number of testing retries and the time period between testing retries, causing the integration test runs to become longer and longer. For example, if the business logic fails because it cannot find the data such as an entity or policy requested then the integration test repeats the calls/requests up to a predetermined number of times (e.g., 7) until all of a sudden the data is replicated and makes its way over to the data plane from the control plane such that the integration testing proceeds or doesn't make its way over to the data plane by the predetermined number of times such that the integration testing fails. However, it is impossible for the client to know why the process failed at this point (e.g., was the fail simply data not replicated yet or was the fail because the data was replicated incorrectly or not at all) because the error code for data not found is nondeterministic (no discovery). This lack of discovery is by design to prevent an intruder such as a hacker from discovering entities, group of entities or business logic in place for various services. Although, this type of problem has been discussed in terms of replication and integration between the control plane and data plane, it should be understood that this type of problem could occur in other contexts and outside the realm of integration testing. For example, this type of problem can also be seen with replication and integration in different regions e.g., geographic regions—Phoenix versus Sacramento) of a control plane that are communicating with one another.

To overcome these challenges and others, various embodiments are directed to having the create/update/delete APIs in the control plane return a custom response header (for example opc-replication-id), which can be used to for making eventual consistency cache updates deterministic. Specifically, when creating any new data or modifying the data, the control plane, data plane, and replication service use identifiers (e.g., identifier numbers that sequential increase for each replication event) associated with the data to track and continuously identify the data. Aspects of the present disclosure leverage these identifiers by communicating them back to the client in custom response headers such that the client can include the identifiers within conditional headers (opc-replication-id) in subsequent requests to the control plane and data plane. If a request (e.g., an integration test request) includes this conditional header, the control plane or data plane would return a response to the request (the response could be the result of processing the request or any other error code not associated with a delay in replication) so long as replication has caught up to the replication value in the conditional header (determined by a comparison of the identifier in the conditional header to a identifier(s) associated with current data replication). Otherwise, the control plane or data plane would return a deterministic error code (e.g., an HTTP response code 412 Pre-condition failed). The deterministic error code would indicate to the client that the data plane host the client is sending a request to is not up-to-date yet and to retry the request at a later time, e.g., a few seconds/minutes (potentially using exponential back-off).

For example, if a client creates a user in a database, the creation or replication service generates and assigns an identifier to the user entity created as part of the creation/replication process, the identifier is then reported back in a http response header to the client as part of the response to the request for creating the user, and for next request the client can pass the header as a conditional request header in any subsequent request (e.g., a request to the data plane to test the business logic on the new user would include the conditional header with the identifier). The data plane receives the subsequent request having the conditional header with the sequence number, looks at the sequence number in the conditional header, and performs the business logic process if it has the replicated data for the user, but if it does not have the data yet (the data plane has not caught up to the control plane and there is a delay in data replication) then the data plane provides a different deterministic error code instead of a non-discoverable error code. In some instances, the deterministic error code does not disclose whether the resource exists just that the data plane cannot find the resource to process the request. Nonetheless, in such an instance, the error code is at least deterministic of the data plane not being caught up with replication of data, and not an error for some other reason (e.g., a failure in the business logic).

In various embodiments, a technique implemented by a computing system for making eventual consistency cache updates deterministic includes: receiving, at a control plane, a request to execute an operation on data, executing the operation on the data, creating a replication event for the operation and a replication identifier associated with the replication event, sending a response that includes a custom header having the replication identifier, receiving, at a data plane, a subsequent request to execute an operation involving the data, the subsequent request includes the replication identifier, retrieving a replication identifier for a latest replication event executed on the data plane, comparing the replication identifier from the subsequent request and the replication identifier for the latest replication event, determining the replication event associated with the replication identifier from the subsequent request has not been executed on the data plane based on the comparison, and sending a deterministic error message to a client device.

Computing System for Making Eventual Consistency Cache Updates Deterministic

FIG. 1 is a block diagram illustrating a computing environment 100 for making eventual consistency cache updates deterministic in accordance with various embodiments. As shown in FIG. 1, the computing environment 100 includes a client 105, a control plane 110, an integration and replication system 115, a data plane 120, and a storage device 125. The client 105, control plane 110, integration and replication system 115, data plane 120, and storage device 125 comprise one or more computing systems that execute computer-readable instructions (e.g., code, program) to implement functionality of each of the client 105, control plane 110, integration and replication environment 115, data plane 120, and storage device 125. In some embodiments, the control plane 110, the integration and replication system 115, the data plane 120, and the storage device 125 are part of a computing system 130 such as an identity management system.

The computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer systems than those shown in FIG. 1, may combine two or more systems, or may have a different configuration or arrangement of systems and subsystems. For example, although the exemplary computing environment 100 is shown with a single client device 105, any number of client devices 105 may be supported by the computing environment 100. Moreover, the computing environment 100 may be implemented in various different configurations. In some embodiments, the computing environment 100 is implemented in an enterprise servicing users of the enterprise. In other embodiments, the computing environment 100 is implemented on one or more servers of a cloud provider and the network policy creation services of the systems may be provided to subscribers of cloud services on a subscription basis.

The computing environment 100 may be computerized such that each of the illustrated components is configured to communicate with other components via a back plane 125. In instances in which components reside on a same computing device the communication on the back plane 125 may be via an internal communication system such as various types of buses. In instances in which components reside on different computing devices such as different servers the communication on the back plane 125 may be via a network. The network may be any type of network familiar to those skilled in the art that can support data communications using any of a variety of commercially-available protocols, including without limitation TCP/IP, SNA, IPX, AppleTalk, and the like. Merely by way of example, network can be a local area network (LAN) such as an Ethernet network, a Token-Ring network and/or the like, a wide-area network (WAN), a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks. Any other combination of networks, including secured and unsecured network communications are contemplated for use in the systems described herein.

In various embodiments, a user may interact with the control plane 110 using a client device 105 that is communicatively coupled to the control plane 110, possibly via one or more communication networks. The client device 105 may be of various types, including but not limited to, a mobile phone, a tablet, a desktop computer, and the like. The user may represent a user of an enterprise who subscribes to the services provided by the systems of the computing environment 100 for automatically generating data (e.g., entities or network policies) for components of an application 135 to be or presently deployed in a computing environment. The user may interact with the computing system 130 using an application such as a browser executed by the client device 105. For example, the user may use a user interface (UI) (which may be a graphical user interface (GUI)) of an application executed with a programming language such as Python by the client device 105 to interact with the control plane 110.

The control plane 110 receives (via the UI) the interaction such as a request to create, read, update, and/or delete data to be or presently integrated as part of the application 135 to be or presently deployed in the computing environment 100. For instance, a user of an enterprise may wish to add a new entity, group of entities or network policy to an authentication and authorization application to be or presently deployed on an identity management platform. In this case, the client device 105 may provide a request to create, read, update, and/or delete data by the control plane 110. The control plane 110 receives the request and initiates a process to execute the create, read, update, and/or delete data function. This process includes the integration and replication system 115 creating a replication event for the create, read, update, and/or delete data function and assigning a replication identifier to the replication event. The replication event will allow for the create, read, update, and/or delete data function to be replicated on the data plane 120. In some instances, the replication identifier and associated replication event are stored in the storage device 125 (e.g., in a data table) for subsequent retrieval. The application programming interfaces (APIs) 140 in the control plane 110 (e.g., the create/update/delete APIs) return a custom response header (for example opc-replication-id) comprising the replication identifier to the client device 105. In some instances, the control plane APIs 140 implement this using a request filter (e.g., an HTTP request filter) that injects the current value of the last replication event identifier (e.g., LASTSEQUENCENUMBER) from the storage device 125 (e.g., REPLICATION_METADATA table) into the custom header sent back with the response to the client device 110, thereby avoiding the need for any changes to the action handlers themselves. The client device 110 receives the response with the customer response header (for example opc-replication-id) from the control plane 110 and maintains the replication identifier (e.g., stores the replication identifier locally on the client device 105) for subsequent communication with the control plane 110 and data plane 120.

The integration and replication system 115 creates the replication event for the create, read, update, and/or delete data function and initiates communication with the data plane 120 via APIs 145 (e.g., data plane APIs) and the back plane to execute the replication event on the data plane 120. The control plane 110 may receive (via the UI) a subsequent interaction such as a request to execute business logic integrated as part of the application 135 to be or presently deployed in the computing environment 100. For instance, a user of an enterprise may wish to test or use business logic such as a second factor authentication protocol that is part of an authentication and authorization application 135 to be or presently deployed on an identity management platform. The application on the client device 105, which enables the client device 105 to interact with the control plane 110, is configured to propagate the replication identifier maintained on the client device 110 to a custom request header (for example opc-replication-id) for the subsequent request interaction. The control plane 110 receives the request, determines whether to authorize the request, and in response to authorization of the request, forwards the request to the data plane 120.

The data plane 120 uses a separate request filter (e.g., an HTTP request filter) to short-circuit the request from the client device 105 if the custom request header (for example opc-replication-id) is detected in the request and the replication event has not been executed on the data plane 120 (i.e., the state of the data plane has not caught up to the control plane). In other words, the separate request filter on the data plane 120 is configured to determine whether the request includes the custom request header, and if the request includes the custom request header, the data plane 120 will return an answer (e.g., the result of executing the business logic or an error not related to delay of executing the replication event on the data plane 120) to the client device 105 only if the replication event has been executed on the data plane 120. Otherwise, the data plane 120 will return a response error message (e.g., an http error code: 412 Pre-condition failed) indicative or deterministic that the replication event has not been executed on the data plane 120. As used herein, the term "indicative" means the error message can specifically serve as a signal that the replication event has not been executed on the data plane. As used herein, the term "deterministic" means that given a particular input (i.e., the replication event has not been executed on the data plane), the algorithm will always produce the same output of an error message. This technique has the potential to significantly speed up integration testing (only wait when replication is behind) and make integration testing more reliable (no more test failures because the replication was behind).

Techniques for Making Eventual Consistency Cache Updates Deterministic

Figure 2:
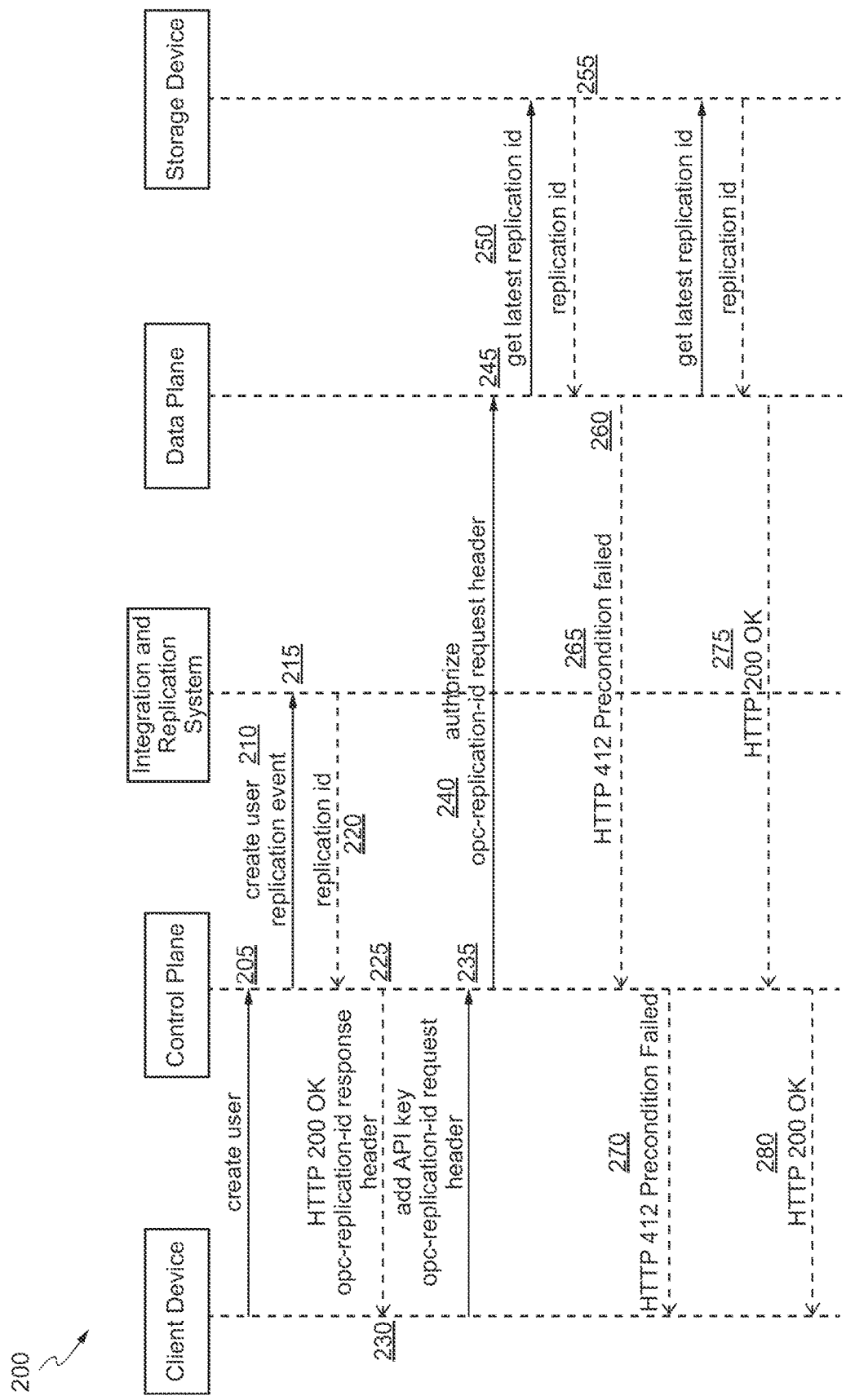
FIG. 2 depicts swim lane diagram illustrating a data plane replication process with custom headers in accordance with various embodiments.
Figure 3:
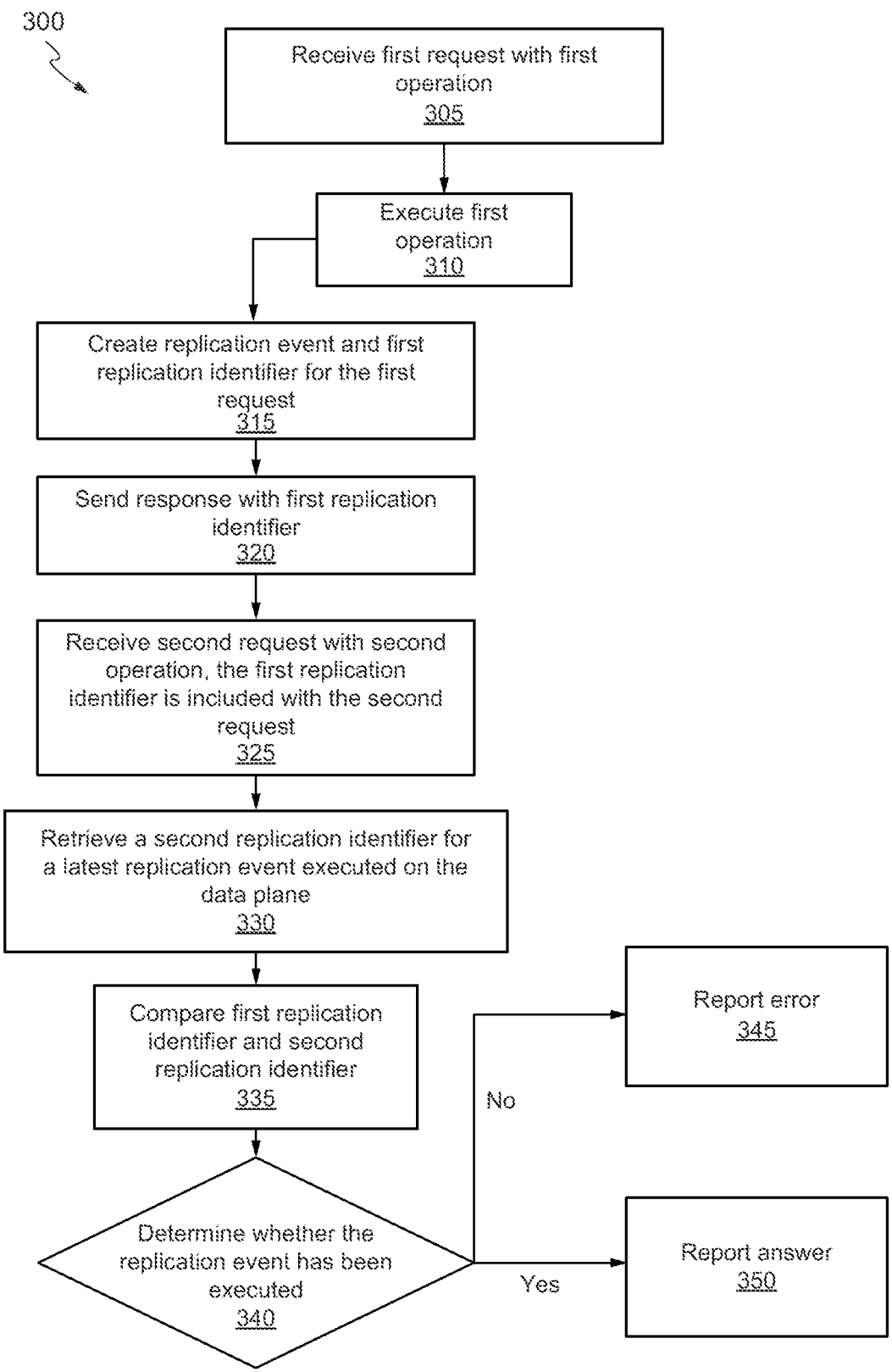
FIG. 3 depicts a flowchart illustrating a process for determining whether a replication event associated with the first replication identifier from a custom header has been executed on a data plane based on a comparison between a first replication identifier and a second replication identifier for a latest replication event executed on the data plane in accordance with various embodiments.

FIGS. 2 and 3 illustrate processes and operations for making eventual consistency cache updates deterministic. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 2 and 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2 and 3 is not intended to be limiting. Other sequences of steps may also be performed according to alternative embodiments. For example, in alternative embodiments the steps outlined above may be performed in a different order. Moreover, the individual steps illustrated in FIGS. 2 and 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 2 shows a swim lane diagram illustrating a data plane replication process 200 with custom headers in accordance with various embodiments. The processes depicted in the swim lane diagram may be implemented by the architecture, systems, and techniques depicted in FIGS. 1 and 4-8. At step 205, a control plane of a computing system receives a request to execute an operation on data. The request is received from a client device via one or more control plane APIs (e.g., create/update/delete APIs). The data may to be or presently integrated as part of an application to be or presently deployed on the computing system. In some instances, the request is to create, read, update, and/or delete data to be or presently integrated as part of the application to be or presently deployed on the computing system. Examples of the data to be implemented for an authentication or authorization application may include a new user, a prior user, credentials of a user, a new policy, a prior policy, rules of a policy, and the like. At step 210, the control plane initiates a process to execute the operation on the data. The process includes the control plane performing the operation on the data, for example, creating, updating, or deleting the data on the control plane, and forwarding the request to the integration and replication system.

At step 215, the integration and replication system receives the request and creates a replication event for the operation and assigns a replication identifier to the replication event. The replication event will be used to replicate execution of the operation on a data plane. In some instances, the replication identifier, the associated replication event, or a combination thereof is stored in a storage device (e.g., in a data table) for subsequent retrieval. The replication identifier only has meaning on the control and data plane services, and is opaque to the callers or users of the computing system. The replication identifier can therefore be encrypted using a key shared between services and regions to prevent callers or users from inferring any usage statistics from the numbers themselves. At step 220, the integration and replication system returns the replication identifier to the control plane.

In some instances, the process to execute the operation on the control plane further includes creating resources that schedule background tasks to run and produce resources that require replication. Policies are an example of this type of resource. When a new policy is created, a policy compiler task is scheduled. When the policy compiler background task processes the policy, the policy compiler background task replicates the policy graph for the tenancy to the data plane via an 'UPDATE POLICY GRAPH' replication event. Thus, any action that relies on this policy being in effect needs to wait till the replication event produced by the policy compiler is processed by the data plane, not the 'CREATE POLICY' event created by createPolicy handler. In order to handle such an instance, a substitute replication identifier may be returned to the control plane at step 220 (as opposed to the actual replication identifier) when a new background task is created. In some instances, the substitute replication identifier associated with the new background task comprises a predefined format such as alphanumeric (e.g., TRX_<trxid>). A table may be created by the integration and replication system to map the substitute replication identifier with the actual replication identifier such as a REPLICATION_MAPPING, which has a TRX_ID column and a REPLICATION_ID column.

When the new background task is scheduled (e.g., the policy compilation is scheduled), the substitute replication identifier is added as an entry within a row of the TRX_ID column and the corresponding row of REPLICATION_ID column is left empty. When the background task is completed (e.g., the background task policy compiler has compiled the policies and written the replication log), the integration and replication system updates the row of REPLICATION_ID column with the actual replication identifier.

In some instances, the mapping table (e.g., REPLICATION_MAPPING) can additionally or alternatively be used to make cross-region replication deterministic. Cross-region as used herein means across geographic regions, across tenants, and/or across computing systems, e.g., between a home region and a subscribe region. Typically in cross-region replication a backfill processor reads request records from the inbox table in the replication database. A data column in a data table stores the data coming from the home region including an actual replication identifier generated for the replication event. The account service knows the home region for each tenant. When the backfill processor processes the request record from the inbox table, the backfill processor can write a mapping to the data table (e.g., REPLICATION_MAPPING) for the substitute replication identifier in a predefined format such as alphanumeric-REG-nnnnnn (e.g., IAD-123456) associated with the actual replication identifier generated for the replication event.

At step 225, the one or more control plane APIs return a custom response header (for example opc-replication-id) comprising the replication identifier (actual or substitute replication identifier) to the client device that initiated the request. In some instances, the control plane APIs implement this using a request filter (e.g., an HTTP request filter) that injects the current value of the last replication event identifier (actual or substitute replication identifier) from the storage device (e.g., REPLICATION_METADATA table or the REPLICATION_MAPPING table) into the custom header sent back with the response to the client device, thereby avoiding the need for any changes to the action handlers themselves.

At step 230, the client device receives the response with the customer response header (for example opc-replication-id) from the control plane and maintains the replication identifier for subsequent communication with the control plane and data plane services. Maintaining the replication identifier may include storing the replication identifier locally on the client device.

At step 235, the control plane or the data plane of the computing system receives a subsequent request to execute an operation involving the data on the computing system. The subsequent request is received from the client device via one or more control plane or data plane APIs (e.g., execute APIs). An example of a subsequent request is an integration test to be run using the data on the computing system that was operated on in step 210. Another example of a subsequent request is a user request to be run using the data on the computing system that was operated on in step 210. In some instances, the subsequent operation is logic (e.g., business logic) to be executed using the data to be or presently integrated as part of the application to be or presently deployed on the computing system. An application on the client device, which enables the client device to interact with the control plane and data plane services, is configured to propagate the replication identifier maintained on the client device to a custom request header (for example opc-replication-id) for the subsequent request. The replication identifier may be propagated by the application maintaining an association between the replication identifier and the prior request, operation, and/or data received in step 205.

At optional step 240 (in the instance the request is received at the control plane), the control plane forwards the subsequent request to the data plane for processing. In some embodiments, the control plane determines whether to authorize the subsequent request, and in response to authorization of the subsequent request, forwards the subsequent request to the data plane for processing. In some instances, the determination to authorize the subsequent request is based on credentials of a user to provide the given subsequent request, e.g., the user is authorized to request the execution of the business logic. In other instances, the determination to authorize the subsequent request is based on whether the custom request header or the replication identifier is included with the subsequent request. For example, if a replication id filter of the control plane detects a custom request header or the replication identifier within the subsequent request, the replication id filter forwards the subsequent request to the data plane. In contrast, if the replication id filter of the control plane does not detect a custom request header or the replication identifier within the subsequent request, the replication id filter returns an error message (an error not related to delay of executing the replication event on the data plane) to the client device. In some embodiments, the error message is indicative or deterministic of failure to provide a custom request header or the replication identifier with the subsequent request.

In yet other instances, the determination to authorize the subsequent request is based on whether a mapping table includes a replication identifier. For example, in the instances where background tasks are scheduled, if a replication id filter of the control plane detects a predefined format for a substitute replication identifier such as an alphanumeric format, the replication id filter checks the mapping table for an actual replication identifier using the substitute replication identifier as a key. If there is no actual replication identifier yet (e.g., policies are not compiled yet), the replication id filter returns an error message to the client device such as 412 pre-condition failed. In some embodiments, the error message is indicative or deterministic of an incomplete background task and/or an absence of a replication identifier for the replication event. In contrast, if there is an actual replication identifier (e.g., policies are compiled), the replication id filter inserts the actual replication identifier in the customer header as the replication identifier (for example opc-replication-id) and the replication id filter forwards the subsequent request to the data plane.

Moreover, in the instances where cross-region replication is implemented, if a subsequent request comes from a home region to a replication id filter in a subscribed region and the replication id filter detects a predefined format for a substitute replication identifier such as an alphanumeric format, the replication id filter checks the mapping table for an actual replication identifier using the substitute replication identifier as a key. If there is no actual replication identifier yet (e.g., the home region has not yet contacted the subscriber region), the replication id filter returns an error message to the client device such as 412 pre-condition failed. In some embodiments, the error message is indicative or deterministic of the backfill processor not yet processing the request record from the inbox table and/or an absence of a replication identifier for the replication event. In contrast, if there is an actual replication identifier (e.g., the home region has contacted the subscriber region), the replication id filter inserts the actual replication identifier in the customer header as the replication identifier (for example opc-replication-id) and the replication id filter forwards the subsequent request to the data plane. As should be understood, the authorization determination could be made using any one of the aforementioned techniques, or any combination thereof.

At step 245, the data plane of the computing system receives the subsequent request either from the client device directly (as discussed with respect to step 235) or via the control plane (as discussed with respect to step 240). At step 250, a separate replication id filter of the data plane sends a call to a data storage device (e.g., a database or data table) to retrieve a replication identifier for the latest replication event executed on the data plane. At step 255, the replication identifier for the latest replication event is retrieved from the data storage device and forwarded back to the replication id filter of the data plane.

At step 260, the replication id filter of the data plane compares the replication identifier for the latest replication event retrieved in step 255 with the replication identifier from the custom request header of the subsequent request received in step 245. The replication id filter of the data plane determines, based on the comparison, whether the replication event associated with the replication identifier from the custom request header of the subsequent request has been executed on the data plane. As used herein, when an action is "based on" something, this means the action is based at least in part on at least a part of the something. This determination may be made in a number of ways depending upon the type of replication identifiers being issued. Fundamentally, the replication id filter of the data plane is determining whether the replication identifier from the custom request header of the subsequent request issued prior to, at the same time (the replication identifier is the same), or after issuance of the replication identifier for the latest replication event. For example, if the replication identifiers are issued sequentially then the replication id filter determines whether the replication identifier for the latest replication event is greater than, equal to, or less than the replication identifier from the custom request header of the subsequent request. If the replication identifier from the custom request header of the subsequent request did issue prior to issuance of the replication identifier for the latest replication event or at the same time (the replication identifier is the same), then it is determinable that the replication event associated with the replication identifier from the custom request header of the subsequent request has been executed on the data plane. If the replication identifier from the custom request header of the subsequent request did not issue prior to issuance of the replication identifier for the latest replication event or at the same time (the replication identifier is the same), then it is determinable that the replication event associated with the replication identifier from the custom request header of the subsequent request has not been executed on the data plane.

In response to the replication event associated with the replication identifier from the custom request header not being executed on the data plane, at step 265 the replication id filter of the data plane returns an error message to the control plane such as 412 pre-condition failed. The error message is indicative or deterministic that the replication event has not been executed on the data plane, and thus failure to execute the subsequent request is due to a delay in executing a replication event for a resource utilized with the subsequent request. At step 270, the replication id filter of the control plane returns the error message to the client device. Alternatively, in response to the replication event associated with the replication identifier from the custom request header being executed on the data plane, at step 275 the replication id filter of the data plane returns an answer to the control plane. At step 280, the replication id filter of the control plane returns the answer to the client device. The answer can be the result of executing the request on the data plane such as the result generated from executing the business logic on the data plane or the answer can be any error other than an error related to a delay in executing the replication event on the data plane such as a business logic failure to execute error.

FIG. 3 shows a flowchart 300 that illustrates a process for determining whether a replication event associated with the first replication identifier from a custom header has been executed on a data plane based on a comparison between a first replication identifier and a second replication identifier for a latest replication event executed on the data plane. In some embodiments, the processes depicted in flowchart 300 may be implemented by the architecture, systems, and techniques depicted in FIGS. 1 and 4-8. At step 305, a first request is received at a control plane of a computing system from a client device. The first request is to execute a first operation on data. In some embodiments, the first request is to create, read, update, and/or delete the data, which is to be or presently integrated as part of an application to be or presently deployed on the computing system.

At step 310, the first operation is executed by the computing system on the data. At step 315, a replication event for the operation and a first replication identifier associated with the replication event are created by the computing system. The replication event will be used to replicate execution of the first operation on a data plane. At step 320, a response is sent by the computing system back to the client device concerning the execution of the first operation on the data. The response comprises a custom header having the first replication identifier.

In some embodiments, the executing the first operation comprises: (i) creating a resource that schedules a background task to run and produce another resource that requires replication, and (ii) in response to scheduling the background task, writing a substitute replication identifier associated with the background task and the first operation to a data table. In this instance, the response comprises the custom header having the substitute replication identifier rather than the first replication identifier. The executing of the first operation may further comprise: (iii) executing the background task to run and produce another resource that requires replication, and (iv) in response to completing execution of the background task, writing the first replication identifier associated with the first operation to the data table.

In other embodiments, the control plane is located within a home region of the computing system and the first request is written to an inbox table in a replication database located within a subscriber region of the computing system. The first replication identifier associated with the first operation is written to a data table. The executing the first operation comprises: (i) executing, by a backfill processor within the subscriber region, the first operation of the first request from the inbox table in the replication database, and (ii) in response to executing the first operation within the subscriber region, writing a substitute replication identifier associated with first operation to the data table. In this instance, the response comprises the custom header having the substitute replication identifier rather than the first replication identifier.

At step 325, a second request is received by the data plane of the computing system to execute a second operation involving the data. The second request is received from the client device and includes the custom header having the first replication identifier. In some embodiments, the second request includes the custom header having the substitute replication identifier; and in response to receiving the substitute replication identifier, the first replication identifier is identified from the data table using the substitute replication identifier as a key.

At step 330, in response to receiving the second request, a second replication identifier is retrieved by the computing system for a latest replication event executed on the data plane. At step 335, the first replication identifier and the second replication identifier are compared by the computing system. At step 340, a determination is made by the computing system as to whether the replication event associated with the first replication identifier from the custom header has been executed on the data plane based on the comparison between the first replication identifier and the second replication identifier. The determining whether the replication event associated with the first replication identifier from the custom header has been executed on the data plane comprises determining whether the first replication identifier from the custom header of the second request issued prior to, at the same time, or after issuance of the second replication identifier for the latest replication event.

At step 345, in response to determining the replication event has not been executed on the data plane, an error message is sent by the computing system to the client device. The error message is indicative or deterministic that the replication event has not been executed on the data plane. At step 350, in response to determining the replication event has been executed on the data plane, an answer is sent by the computing system to the client device. The answer can be the result of executing the request on the data plane such as the result generated from executing the second operation on the data plane or the answer can be any error other than an error related to a delay in executing the replication event on the data plane such as a business logic failure to execute error.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
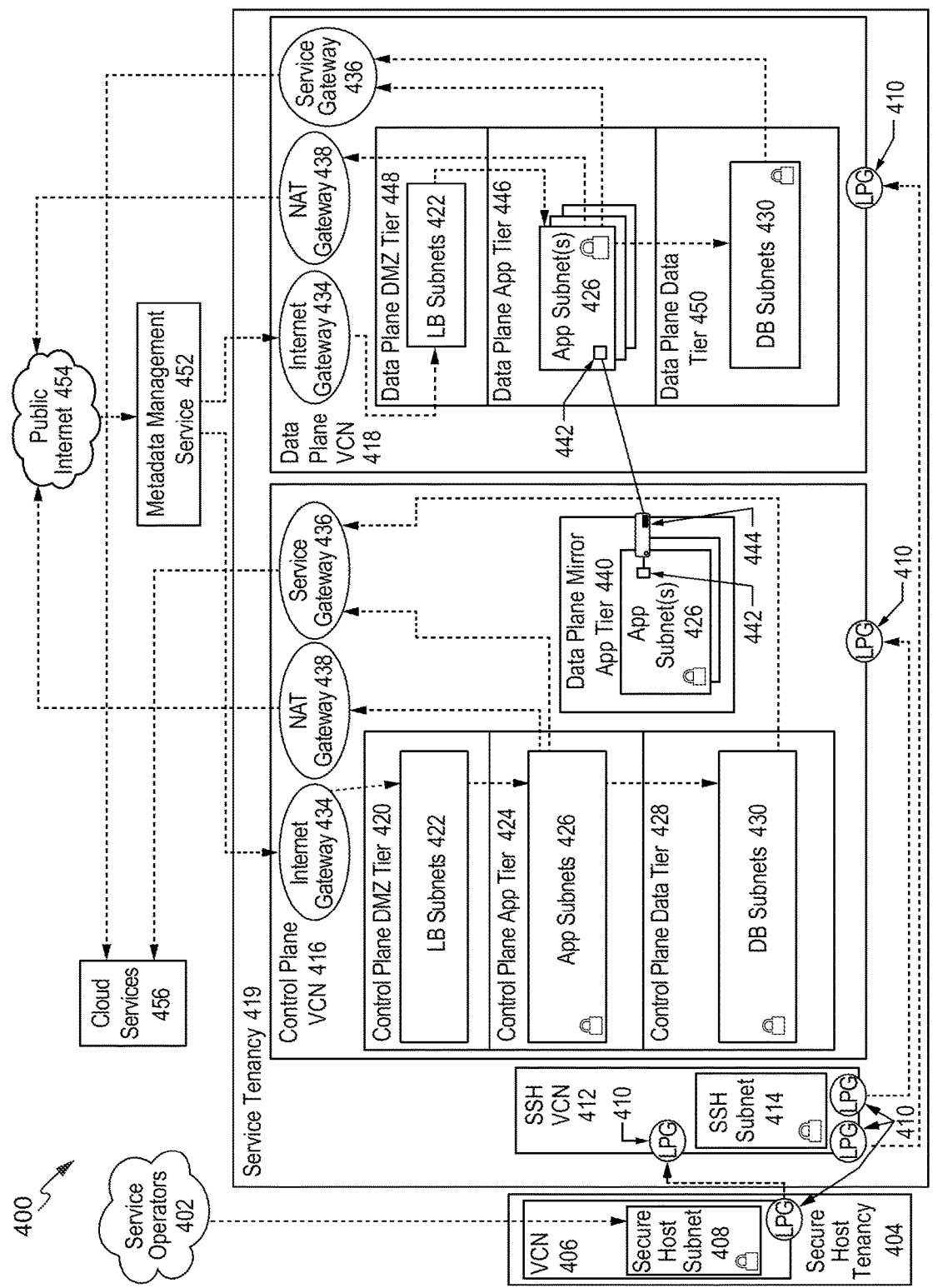
FIG. 4 depicts a block diagram illustrating one pattern for implementing a cloud infrastructure as a service system in accordance with various embodiments.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
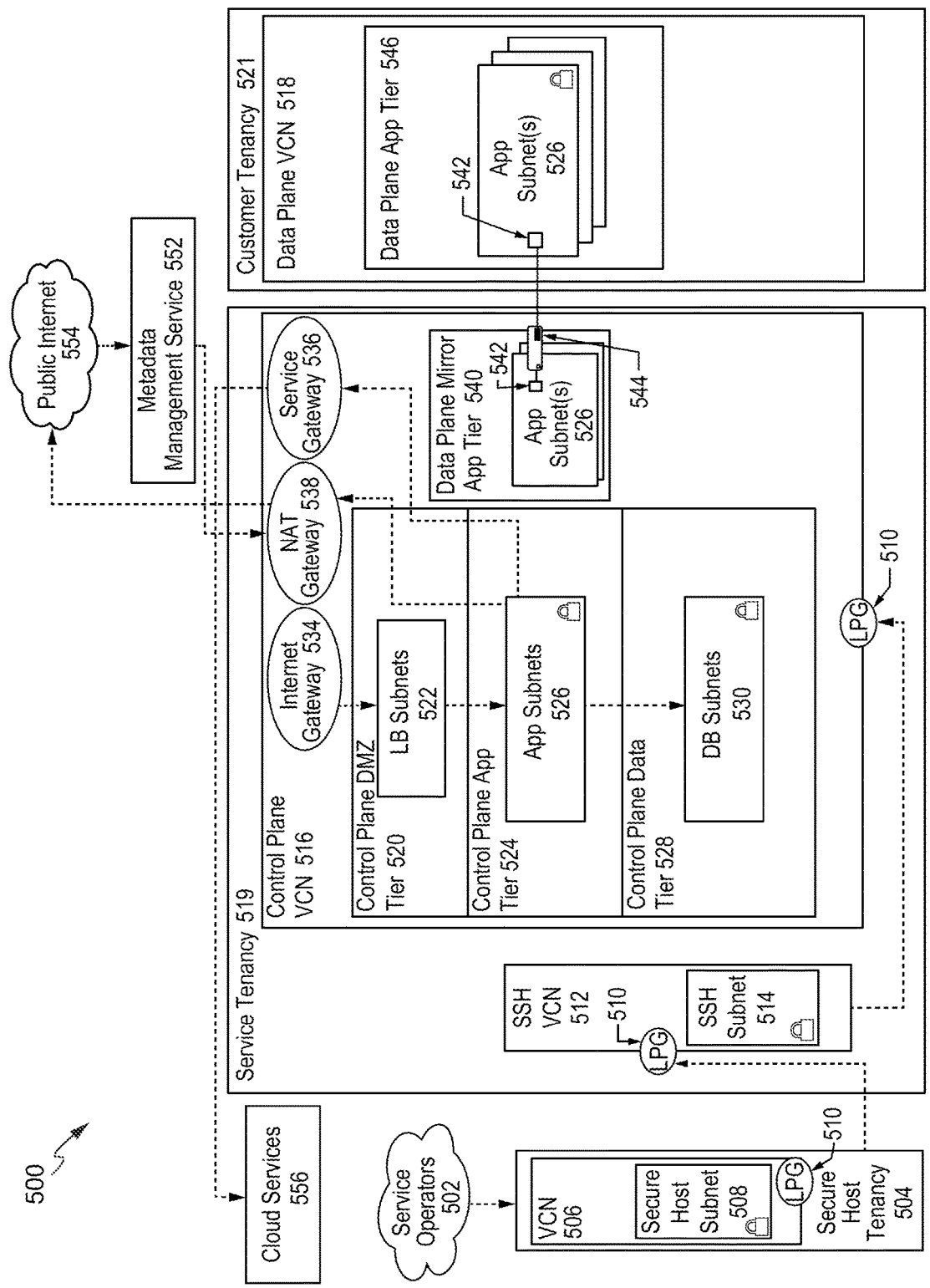
FIG. 5 depicts a block diagram illustrating another pattern for implementing a cloud infrastructure as a service system in accordance with various embodiments.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g. the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g. the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g. the metadata management service 452 of FIG. 4) that can be communicatively coupled to public Internet 554 (e.g. public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g. cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
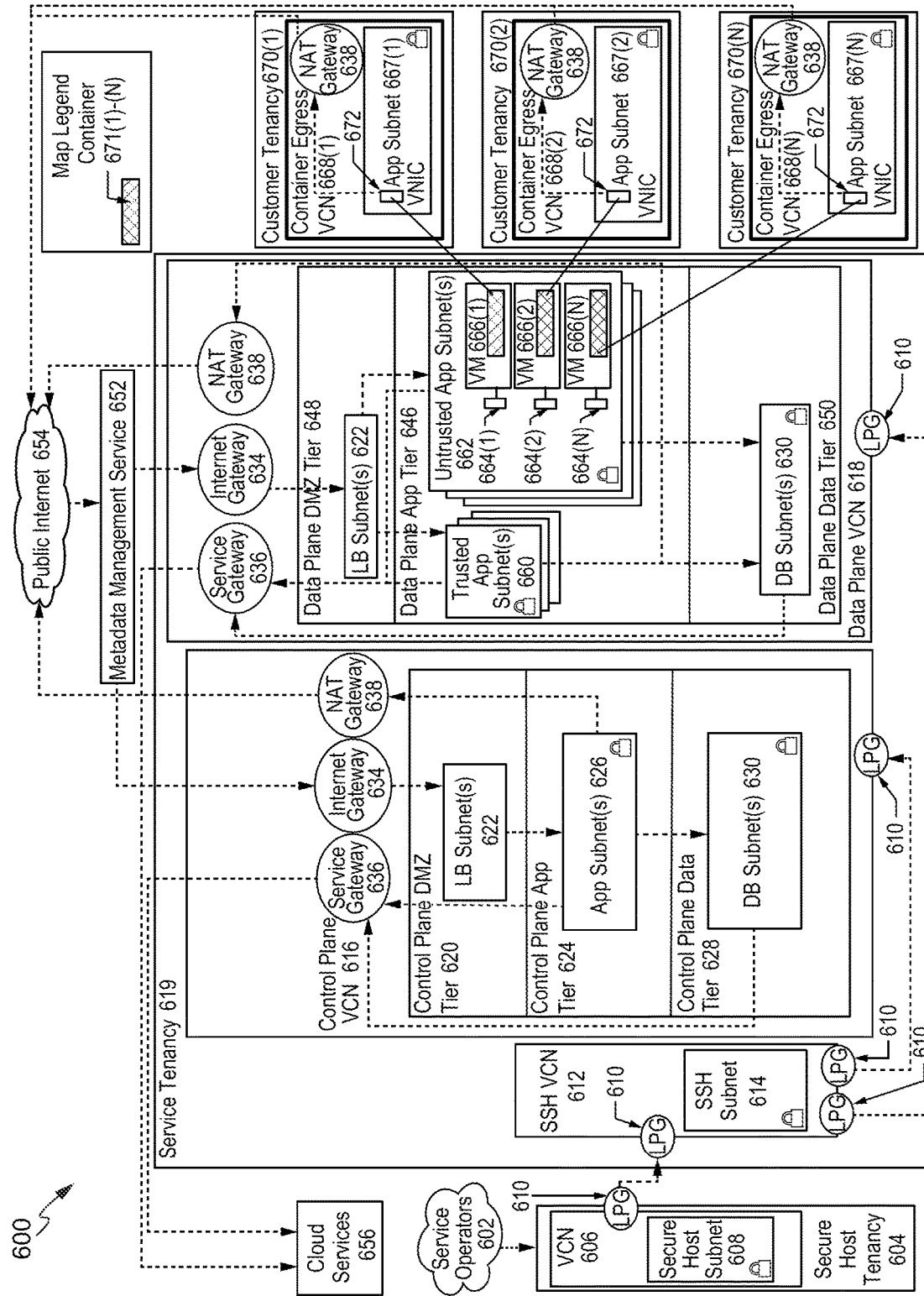
FIG. 6 depicts a block diagram illustrating another pattern for implementing a cloud infrastructure as a service system in accordance with various embodiments.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
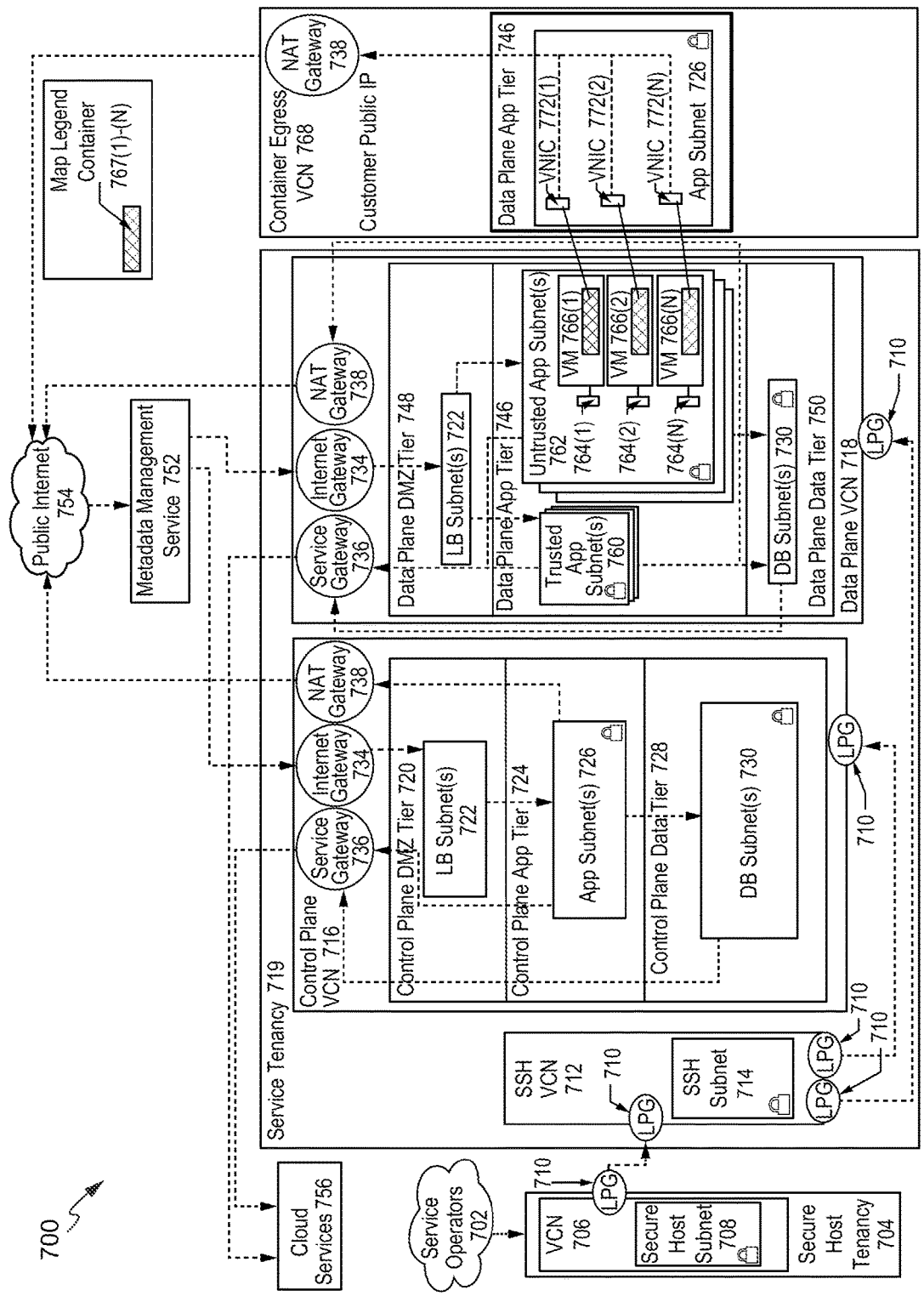
FIG. 7 depicts a block diagram illustrating another pattern for implementing a cloud infrastructure as a service system in accordance with various embodiments.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT) gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, at a control plane of a computing system, a first request to execute a first operation on data, wherein the request is received from a client device;
   executing, by the computing system, the first operation on the data;
   creating, by the computing system, a replication event for the operation and a first replication identifier associated with the replication event, wherein the replication event will be used to replicate execution of the first operation on a data plane;
   sending, by the computing system, a response back to the client device concerning the execution of the first operation on the data, wherein the response comprises a custom header having the first replication identifier;

receiving, at the data plane of the computing system, a second request to execute a second operation involving the data, wherein the second request is received from the client device and includes the custom header having the first replication identifier;

in response to receiving the second request, retrieving, by the computing system, a second replication identifier for a latest replication event executed on the data plane;

comparing, by the computing system, the first replication identifier and the second replication identifier;

determining, by the computing system, whether the replication event associated with the first replication identifier from the custom header has been executed on the data plane based on the comparison between the first replication identifier and the second replication identifier; and in response to determining the replication event has not been executed on the data plane, sending, by the computing system, an error message to the client device, wherein the error message is indicative that the replication event has not been executed on the data plane.

2. The method of claim 1, wherein the first request is to create, read, update, and/or delete the data, which is to be or presently integrated as part of an application to be or presently deployed on the computing system, and wherein the error message is deterministic that the replication event has not been executed on the data plane.

3. The method of claim 1, wherein the executing the first operation comprises:

creating, by the computing system, a resource that schedules a background task to run and produce another resource that requires replication;

in response to scheduling the background task, writing, by the computing system, a substitute replication identifier associated with the background task and the first operation to a data table, wherein the response comprises the custom header having the substitute replication identifier rather than the first replication identifier;

executing, by the computing system, the background task to run and produce the another resource that requires replication; and in response to completing execution of the background task, writing, by the computing system, the first replication identifier associated with the first operation to the data table.

4. The method of claim 3, wherein:

the second request includes the custom header having the substitute replication identifier; and in response to receiving the substitute replication identifier, identifying, by the computing system, the first replication identifier from the data table using the substitute replication identifier as a key.

5. The method of claim 1, further comprising:

writing, by the computing system, the first request to an inbox table in a replication database located within a subscriber region, wherein the control plane is located within a home region; and writing, by the computing system, the first replication identifier associated with the first operation to a data table, wherein the executing the first operation comprises:

executing, by a backfill processor within the subscriber region of the computing system, the first operation of the first request from the inbox table in the replication database; and in response to executing the first operation within the subscriber region, writing, by the computing system, a substitute replication identifier associated with first operation to the data table, wherein the response comprises the custom header having the substitute replication identifier rather than the first replication identifier.

6. The method of claim 5, wherein:

the second request includes the custom header having the substitute replication identifier; and in response to receiving the substitute replication identifier, identifying, by the computing system, the first replication identifier from the data table using the substitute replication identifier as a key.

7. The method of claim 1, wherein the determining whether the replication event associated with the first replication identifier from the custom header has been executed on the data plane comprises determining whether the first replication identifier from the custom header of the second request issued prior to, at the same time, or after issuance of the second replication identifier for the latest replication event.

8. A non-transitory computer-readable memory storing a plurality of instructions executable by one or more processors, the plurality of instructions comprising instructions that when executed by the one or more processors cause the one or more processors to perform processing comprising:

receiving, at a control plane of a computing system, a first request to execute a first operation on data, wherein the request is received from a client device;

executing, by the computing system, the first operation on the data;

creating, by the computing system, a replication event for the operation and a first replication identifier associated with the replication event, wherein the replication event will be used to replicate execution of the first operation on a data plane;

sending, by the computing system, a response back to the client device concerning the execution of the first operation on the data, wherein the response comprises a custom header having the first replication identifier;

receiving, at the data plane of the computing system, a second request to execute a second operation involving the data, wherein the second request is received from the client device and includes the custom header having the first replication identifier;

in response to receiving the second request, retrieving, by the computing system, a second replication identifier for a latest replication event executed on the data plane;

comparing, by the computing system, the first replication identifier and the second replication identifier;

determining, by the computing system, whether the replication event associated with the first replication identifier from the custom header has been executed on the data plane based on the comparison between the first replication identifier and the second replication identifier;

in response to determining the replication event has not been executed on the data plane, sending, by the computing system, an error message to the client device, wherein the error message is indicative or deterministic that the replication event has not been executed on the data plane; and in response to determining the replication event has been executed on the data plane, sending, by the computing system, an answer to the client device.

9. The non-transitory computer-readable memory of claim 8, wherein the first request is to create, read, update, and/or delete the data, which is to be or presently integrated as part of an application to be or presently deployed on the computing system, and wherein the error message is deterministic that the replication event has not been executed on the data plane.

10. The non-transitory computer-readable memory of claim 8, wherein the executing the first operation comprises:
creating, by the computing system, a resource that schedules a background task to run and produce another resource that requires replication;
in response to scheduling the background task, writing, by the computing system, a substitute replication identifier associated with the background task and the first operation to a data table, wherein the response comprises the custom header having the substitute replication identifier rather than the first replication identifier;
executing, by the computing system, the background task to run and produce the another resource that requires replication; and
in response to completing execution of the background task, writing, by the computing system, the first replication identifier associated with the first operation to the data table.

11. The non-transitory computer-readable memory of claim 10, wherein:
the second request includes the custom header having the substitute replication identifier; and
in response to receiving the substitute replication identifier, identifying, by the computing system, the first replication identifier from the data table using the substitute replication identifier as a key.

12. The non-transitory computer-readable memory of claim 8, wherein the processing further comprises:
writing, by the computing system, the first request to an inbox table in a replication database located within a subscriber region, wherein the control plane is located within a home region; and
writing, by the computing system, the first replication identifier associated with the first operation to a data table,
wherein the executing the first operation comprises:
executing, by a backfill processor within the subscriber region of the computing system, the first operation of the first request from the inbox table in the replication database; and
in response to executing the first operation within the subscriber region, writing, by the computing system, a substitute replication identifier associated with first operation to the data table, wherein the response comprises the custom header having the substitute replication identifier rather than the first replication identifier.

13. The non-transitory computer-readable memory of claim 12, wherein:
the second request includes the custom header having the substitute replication identifier; and
in response to receiving the substitute replication identifier, identifying, by the computing system, the first replication identifier from the data table using the substitute replication identifier as a key.

14. The non-transitory computer-readable memory of claim 8, wherein the determining whether the replication event associated with the first replication identifier from the custom header has been executed on the data plane comprises determining whether the first replication identifier from the custom header of the second request issued prior to, at the same time, or after issuance of the second replication identifier for the latest replication event.

15. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
receiving, at a control plane of a computing system, a first request to execute a first operation on data, wherein the request is received from a client device;
executing, by the computing system, the first operation on the data;
creating, by the computing system, a replication event for the operation and a first replication identifier associated with the replication event, wherein the replication event will be used to replicate execution of the first operation on a data plane;
sending, by the computing system, a response back to the client device concerning the execution of the first operation on the data, wherein the response comprises a custom header having the first replication identifier;
receiving, at the data plane of the computing system, a second request to execute a second operation involving the data, wherein the second request is received from the client device and includes the custom header having the first replication identifier;
in response to receiving the second request, retrieving, by the computing system, a second replication identifier for a latest replication event executed on the data plane;
comparing, by the computing system, the first replication identifier and the second replication identifier;
determining, by the computing system, whether the replication event associated with the first replication identifier from the custom header has been executed on the data plane based on the comparison between the first replication identifier and the second replication identifier;
in response to determining the replication event has not been executed on the data plane, sending, by the computing system, an error message to the client device, wherein the error message is indicative or deterministic that the replication event has not been executed on the data plane; and
in response to determining the replication event has been executed on the data plane, sending, by the computing system, an answer to the client device.

16. The system of claim 15, wherein the first request is to create, read, update, and/or delete the data, which is to be or presently integrated as part of an application to be or presently deployed on the computing system, and wherein the error message is deterministic that the replication event has not been executed on the data plane.

17. The system of claim 15, wherein the executing the first operation comprises:
creating, by the computing system, a resource that schedules a background task to run and produce another resource that requires replication;
in response to scheduling the background task, writing, by the computing system, a substitute replication identifier associated with the background task and the first operation to a data table, wherein the response comprises the custom header having the substitute replication identifier rather than the first replication identifier;

executing, by the computing system, the background task to run and produce the another resource that requires replication; and in response to completing execution of the background task, writing, by the computing system, the first replication identifier associated with the first operation to the data table.

18. The system of claim 17, wherein:

the second request includes the custom header having the substitute replication identifier; and in response to receiving the substitute replication identifier, identifying, by the computing system, the first replication identifier from the data table using the substitute replication identifier as a key.

19. The system of claim 15, wherein the processing further comprises:

writing, by the computing system, the first request to an inbox table in a replication database located within a subscriber region, wherein the control plane is located within a home region; and writing, by the computing system, the first replication identifier associated with the first operation to a data table, wherein the executing the first operation comprises:

executing, by a backfill processor within the subscriber region of the computing system, the first operation of the first request from the inbox table in the replication database; and in response to executing the first operation within the subscriber region, writing, by the computing system, a substitute replication identifier associated with first operation to the data table, wherein the response comprises the custom header having the substitute replication identifier rather than the first replication identifier.

20. The system of claim 19, wherein:

the second request includes the custom header having the substitute replication identifier; and in response to receiving the substitute replication identifier, identifying, by the computing system, the first replication identifier from the data table using the substitute replication identifier as a key.

* * * * *